United States Patent
Klier

(10) Patent No.: US 12,341,441 B2
(45) Date of Patent: Jun. 24, 2025

(54) INVERTER UNIT WITH DETECTION OF VOLTAGE DROPS ON SEMICONDUCTOR SWITCHES

(71) Applicant: SEMIKRON ELEKTRONIK GMBH & CO. KG, Nuremberg (DE)

(72) Inventor: Johannes Klier, Amberg (DE)

(73) Assignee: SEMIKRON ELEKTRONIK GMBH & CO. KG, Nuremberg (DE)

( * ) Notice: Subject to any disclaimer, the term of this patent is extended or adjusted under 35 U.S.C. 154(b) by 347 days.

(21) Appl. No.: 18/104,776

(22) Filed: Feb. 1, 2023

(65) Prior Publication Data

US 2023/0261589 A1 Aug. 17, 2023

(30) Foreign Application Priority Data

Feb. 11, 2022 (DE) ...................... 10 2022 103 217.5

(51) Int. Cl.
*H02M 7/5387* (2007.01)
*H02M 1/08* (2006.01)
*H02M 7/487* (2007.01)

(52) U.S. Cl.
CPC ........... *H02M 7/5387* (2013.01); *H02M 1/08* (2013.01); *H02M 7/487* (2013.01); *H02M 7/53871* (2013.01)

(58) Field of Classification Search
CPC ............... H02M 7/5387; H02M 7/487; H02M 7/53871; H02M 1/08
See application file for complete search history.

(56) References Cited

U.S. PATENT DOCUMENTS 5,182,702 A * 1/1993 Hiramatsu ............ H02M 1/425
363/37

FOREIGN PATENT DOCUMENTS

WO WO 2019/108223 A1 6/2019
WO WO-2022153520 A1 * 7/2022

OTHER PUBLICATIONS

DE 10 2022 103 217.5 , Examination Report dated Sep. 27, 2022, 9 pages—German, 6 pages—English.

* cited by examiner

*Primary Examiner* — Jue Zhang
*Assistant Examiner* — Jye-June Lee
(74) *Attorney, Agent, or Firm* — Andrew F. Young, Esq.; NOLTE LACKENBACH SIEGEL

(57) ABSTRACT

Load bridges (2) of an inverter unit (1) include load branches having semiconductor switches (4, 5, 15, 16), that have a node point (6) which is connected to a load (7) and to two different potentials (P1, P2). Node points (6) are connected via a first resistance circuit (8) to potential (P1). Node points (6) are further connected via second resistance circuits (9) to tap-off points (11). The tap-off points (11) are connected via third resistance circuits (10) to the other potential (P2). At each of the tap-off points (11), a potential (U1, U2, U3) is tapped-off and is fed to a monitoring device (12). The monitoring device (12) determines the difference (U1') between the tapped-off potentials and the second potential (P2). The control device (3) considers the signals (M1, M2, M3) for the actuation of the load bridges (2).

9 Claims, 3 Drawing Sheets

INVERTER UNIT WITH DETECTION OF VOLTAGE DROPS ON SEMICONDUCTOR SWITCHES

CROSS REFERENCE TO RELATED APPLICATIONS

This application relates to and claims priority to DE 10 2022 103 217.5 filed Feb. 11, 2022, the entire contents of which are incorporated herein fully by reference.

FIGURE SELECTED FOR PUBLICATION

FIG. 2.

BACKGROUND OF THE INVENTION

Field of the Invention

The present invention proceeds from an inverter unit:
wherein the inverter unit comprises a plurality of load bridges,
wherein each of the load bridges comprises a first and a second load branch, via which a node point of the respective load bridge which is connected to a load is connectable to a first and a second potential (P1, P2), and
wherein each of the load branches comprises at least one semiconductor switch.

The present invention further proceeds from an operating method for an inverter unit: wherein a control device of the inverter unit actuates semiconductor switches of a respective first load branch and a respective second load branch of load bridges, such that a load-connected node point between the two load branches of the respective load bridge is temporarily connected via the first load branch of the respective load bridge to a first potential, and via the second load branch of the respective load bridge to a second potential.

Description of the Related Art

Inverter units of this type are generally known. They are frequently employed as supply units, by means of which electric drives or other electric loads can be connected to a DC voltage circuit in a multi-phase arrangement. However, other applications of inverter units of this type are also known.

According to the prior art, the circuit state of a load branch of this type, in many cases, is only detected by means of "DESAT" monitoring of semiconductor switches in the respective load branch.

In a monitoring function of this type, the control device by means of which the semiconductor switches are controlled comprises driver circuits, by means of which, in a respectively conducting semiconductor switch, a current can be driven via the respectively conducting semiconductor switch and fed back to the control device. If, notwithstanding a corresponding control signal from the control device, by means of which it is intended to switch the respective semiconductor switch to a conducting state, no such current is driven, a fault is identified. A fault will also be identified in the event that, notwithstanding a control signal from the control device, by means of which it is intended to switch the respective semiconductor switch to a non-conducting state, a current of this type can nevertheless be driven.

By means of DESAT monitoring, detection can only be executed as to whether or not any current can be driven whatsoever and whether, in consequence, the corresponding semiconductor switch is in a conducting or a non-conducting state. Conversely, no check can be executed of the magnitude of the voltage drop across the semiconductor switch. Moreover, when a respective semiconductor switch is enabled, it is necessary for a dead time to elapse, during which no conclusion can be drawn with respect to the circuit state of the respective semiconductor switch. Finally, it is necessary for dedicated DESAT monitoring to be implemented for each semiconductor switch.

ASPECTS AND OBJECTS OF THE INVENTION

The object of the present invention is the provision of possibilities by means of which, in a simple manner and at any time, not only the binary circuit state of a respective load branch can be detected, but also the voltage drop across the load branch. It is moreover intended that the number of monitoring devices should be reduced, and that the monitoring devices per se should be simplified.

This object is fulfilled by an inverter unit having the features as claimed, and further advantageous configurations of the inverter unit are the subject matter of the dependent claims.

According to the invention, an inverter unit of the above-mentioned type is configured such that:
the respective node point is connected to a first potential via a respective first resistance circuit of a resistance series circuit,
a respective tap-off point of the resistance series circuit is connected via a respective second resistance circuit of the resistance series circuit to the respective node point, and via a respective third resistance circuit of the resistance series circuit to the second potential,
the respective tap-off point is further connected to a monitoring device, which determines the difference between the potential which is tapped-off at the tap-off point and the second potential,
the monitoring device is connected to a control device for the load bridges and, in at least one operating state, wherein one of the two load branches of a respective load bridge is actuated, transmits a signal to the control device, from which it is determined whether the difference between a potential which is tapped-off at a respective tap-off point and the second potential lies outside a voltage range which is predefined by the actuation state of the two load branches of the respective load bridge, and
the control device, upon the actuation of the load bridges, considers the signals which are transmitted thereto by the monitoring device.

For each load bridge it is thus permitted, by means of an individual tap-off point, for the circuit state of the conducting load branch, including the voltage drop across said load bridge, to be detected at any time. In particular, the respective predefined voltage range is dictated by the actuation state of the two load branches.

The circuit state of a load branch and the actuation state of this load branch are closely associated, but are not mutually identical. The actuation state indicates the value at which the control electrodes of the semiconductor switches of the corresponding load branch are actuated, and thus which circuit state the semiconductor switches are intended to assume. Conversely, the circuit state of the load branch indicates how the semiconductor switches of the load branch are actually functioning. The actuation state is thus a target variable, which corresponds to the (actual) circuit state.

In the simplest case, the potential on the respective tap-off point is only evaluated in the event that one of the two load branches of the respective load bridge is intended to assume the conducting state. However, it is possible that, from the signal, it can also be determined whether the difference between the potential which is tapped-off on the respective tap-off point and second potential lies outside a voltage range which is dictated by a rated voltage. In this case, the monitoring device can transmit the signal to the control device, even in the event that neither of the two load branches of a respective load bridge is actuated. By means of this configuration, by reference to the potential on the respective tap-off point, the difference between the first and the second potential, and thus the DC voltage which is actually switched by the respective load bridge, can be determined.

In the simplest case, the first and the second load branch respectively comprise only a single semiconductor switch. In this case, the actuation state of the respective load branch is identical to the actuation state of the semiconductor switch of the corresponding load branch. However, configurations also exist in which the first and the second load branch respectively comprise a plurality of series-connected semiconductor switches. By means of such configurations, for example, a "multilevel converter"—in the simplest case, a three-level converter—can be produced. Preferably, in this case, the first and the second resistance circuit respectively comprise a plurality of series-connected resistance subcircuits, and connection points between the semiconductor switches of the first and the second load branch are connected to connection points between the resistance subcircuits of the first and the second resistance circuit. As a result, a malfunction of a semiconductor switch can be detected, even in the event that a potential is connected to the respective node point which differs from the first and the second potential.

The resistance subcircuits preferably exhibit mutually differing resistance values. As a result, not only can a malfunction of a semiconductor switch be detected, but the location of the defective semiconductor switch can additionally be identified.

By means of the configuration of the inverter unit according to the invention, any dedicated DESAT monitoring of semiconductor switches can be omitted. It is thus possible that the control device does not comprise any driver circuits by means of which, in a respectively conducting semiconductor switch, a current can be driven via the respectively conducting semiconductor switch and fed back to the control device. Circuit complexity is reduced accordingly.

In general, the number of load bridges is greater than 1 and, in particular, is at least 3. In such a case, it is possible for the control device, by reference to a state of the load and/or the load bridges, to decide whether the load is to be transferred to an active short-circuit. If it is intended to establish an active short-circuit, in general, the control device will switch either the first or the second load branches of the load bridges to a conducting state. In the context of an "active short-circuit" functionality, in theory, it is entirely immaterial whether the first or the second load branches are switched to a conducting state. In practice, however, in the event of a malfunction on one of the first or on one of the second load branches, it can be of significance whether the first or the second load branches are switched to the conducting state. In consequence, the control device will preferably employ signals transmitted by the monitoring device in order to determine whether, for the establishment of an active short-circuit, the first or the second load branches of the load bridges are to be switched to a conducting state.

The object is fulfilled by an operating method for an inverter unit having the features as claimed and further the operating method according to the invention are the subject matter of the dependent claims.

According to the invention, an operating method of the above-mentioned type is configured such that:
a potential which is applied to a respective tap-off point of a resistance series circuit, which is connected via a respective second resistance circuit of the resistance series circuit to the respective node point and via a respective third resistance circuit of the resistance series circuit to the second potential, wherein the respective node point is further connected via a respective first resistance circuit of the resistance series circuit to the first potential, is tapped-off and is fed to a monitoring device of the inverter unit,
the monitoring device determines the difference between the potential which is tapped-off at the respective tap-off point and the second potential and, in at least one operating state, in which one of the two load branches of a respective load bridge is actuated, transmits a signal to the control device, from which it is determined whether the difference between the potential which is present on the respective tap-off point and the second potential lies outside a voltage range which is dictated by the actuation state of the two load branches of the respective load bridge, and
the control device, for the actuation of load bridges, considers the signals which are transmitted thereto by the monitoring device.

The above and other aspects, features, objects, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
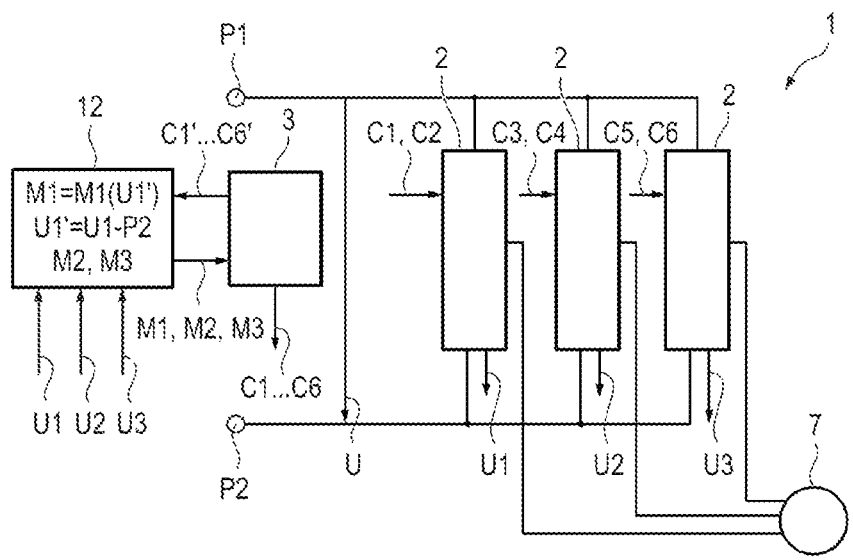
FIG. 1 shows an inverter unit.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

According to FIG. 1, an inverter unit 1 comprises a number of load bridges 2. The number of load bridges 2 is customarily greater than 1. For example, in accordance with the representation according to FIG. 1, three load bridges 2 can be provided. The load bridges 2 are controlled by a control device 3.

The load bridges 2 are customarily of an identical design. Consequently, in conjunction with FIG. 2, the front-most of the load bridges 2 according to FIG. 1 is described. The same comments apply, in an analogous manner, to the remaining load bridges 2.

Figure 2:
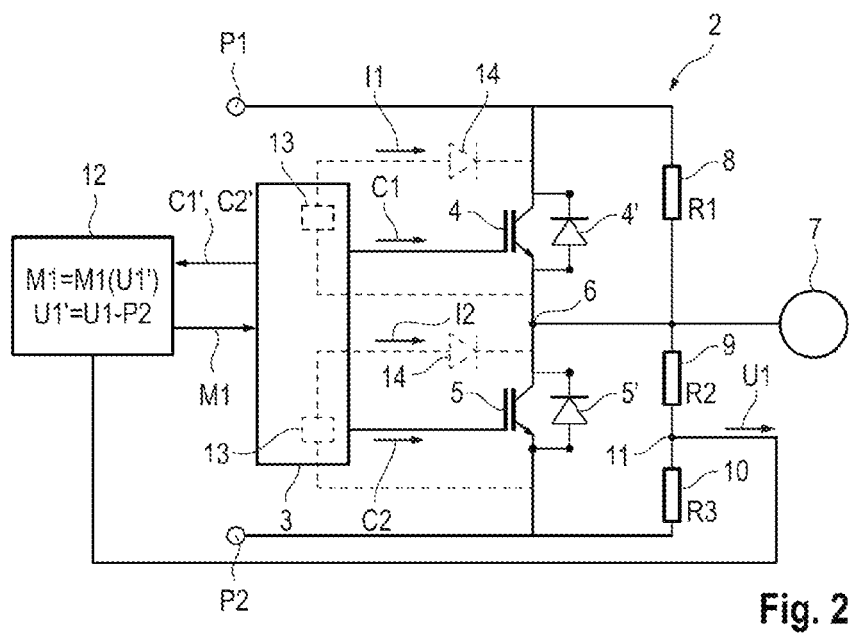
FIG. 2 shows a load bridge and the associated part of a control circuit.

According to FIG. 2, the load bridge 2 comprises a first and a second load branch. Each of the load branches comprises at least one semiconductor switch 4, 5. The semiconductor switches 4, 5 can be configured, for example, in the form of IGBTs or MOSFETs. A freewheeling diode 4', 5' is connected in parallel with each of the semiconductor switches 4, 5 (either intrinsically or as a standalone component).

In the configuration according to FIG. 2, each of the two load branches comprises only a single semiconductor switch 4, 5. Insofar as the configuration according to FIG. 2 is concerned, the respective load branch, in practice, with its respective semiconductor switch 4, 5 (including the respective freewheeling diode 4', 5'), is thus identical.

Via the first load branch, a node point 6 of the load bridge 2 can be connected to a first potential P1. Via the second load branch, the node point 6 can be connected to a second potential P2. The node point 6 itself is connected to a load 7, for example an electric drive.

The potentials P1, P2 are uniform for the load bridges 2. The difference between the two potentials P1 and P2 is described hereinafter as the actual voltage U. The actual voltage U, provided that no malfunction is present in the inverter unit 1 or in the load 7, should be equal to a rated voltage U0.

The node point 6 is connected via a first resistance circuit 8 to the first potential P1. The first resistance circuit 8 can be comprised of a plurality of resistances. In the configuration according to FIG. 2, it is sufficient if this circuit comprises a single resistance, which is identical to the first resistance circuit 8. Independently of the actual configuration, the first resistance circuit 8 nevertheless exhibits a first resistance value R1. The node point 6 is moreover connected via a further resistance circuit 9 to a tap-off point 11. In the configuration according to FIG. 2, it is sufficient if the second resistance circuit 9 comprises a single resistance, which is identical to the second resistance circuit 9. Independently of the actual configuration, the second resistance circuit 9 nevertheless exhibits a second resistance value R2. The tap-off point 11 is moreover connected via a third resistance circuit 10 to the second potential P2. In the configuration according to FIG. 2, it is sufficient if the third resistance circuit 10 comprises a single resistance, which is identical to the third resistance circuit 10. Independently of the actual configuration, the third resistance circuit 10 nevertheless exhibits a third resistance value R3. In combination, the resistance circuits 8, 9 and 10, together with the tap-off point 11, form a resistance series circuit, which is connected in parallel with the load bridge.

The tap-off point 11 is moreover connected to a monitoring device 12. At the tap-off point 11, a potential U1 is tapped-off and is fed to the monitoring device 12. Insofar as necessary, an analogue-digital conversion of the potential U1 can be executed between the tap-off point 11 and the monitoring device 12. Alternatively or additionally, communication of the potential U1 can be executed in an isolated manner (for example, by means of a transformer). The monitoring device 12 determines the difference U1' between the potential U1 which is tapped-off at the tap-off point 11 and the second potential P2. The tapped-off potential U1—evidently—does not correspond to the phase voltage (with no reference symbol) which is fed to the load 7.

The monitoring device 12 is connected to the control device 3. In particular, the monitoring device 12 transmits a signal M1 to the control device 3. For the determination of the signal M1, for example, the monitoring device 12 can execute a method, as described in greater detail hereinafter with reference to FIG. 3. In the context of the explanations associated with FIG. 3, moreover, no distinction is drawn between the two load branches and the associated semiconductor switches 4, 5. With respect to the configuration according to FIG. 2, this is not necessary, as the two semiconductor switches 4, 5 are the only actuated elements in the respective load branch.

Figure 3:
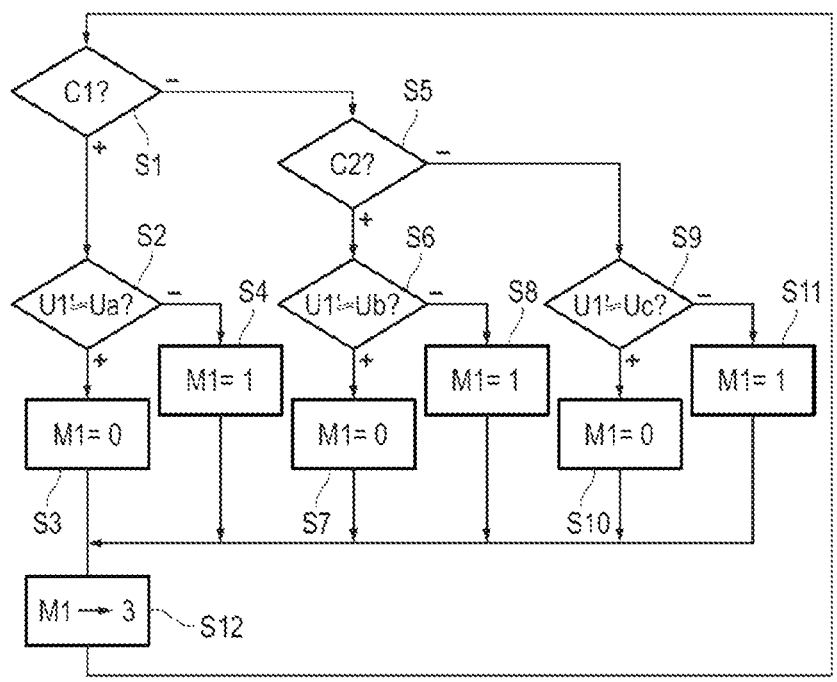
FIG. 3 shows a flow diagram.

According to FIG. 3, in a step S1, the monitoring device 12 firstly executes a check as to whether the first semiconductor switch 4 is to be switched to the conducting state. The monitoring device 12 executes the check according to step S1 with reference to the value of a control signal C1, by means of which the first semiconductor switch 4 is controlled by the control device 3. The corresponding value is fed to the monitoring device 12, for example by the control device 3, in the form of the corresponding information C1'.

If the first semiconductor switch 4 is to be switched to the conducting state, in step S2, the monitoring device 12 executes a check as to whether the difference U1'=U1−P2 lies within a predefined first voltage range. The first voltage range comprises voltages which encompass a first voltage value Ua. The first voltage value Ua is given by:

$$Ua = R3*(U0-Ud)/(R2+R3)$$

where Ud is the conducting-state voltage which is released across the semiconductor switch 4, if the latter is fully conducting. The conducting-state voltage Ud generally lies in the region of 1 V, or slightly lower. In general, it assumes the same value for the semiconductor switch 5.

If the difference U1' lies within the first voltage range, in a step S3, the monitoring device 12 sets the signal M1 to the value M1=0 which, in practice, signifies "semiconductor switch 4 properly conducting". If the difference U1' lies outside the first voltage range, in a step S4, the monitoring device 12 sets the signal M1 to the value M1=1 which, in practice, signifies "semiconductor switch 4 not properly conducting".

If the first semiconductor switch 4 is not to be switched to the conducting state, in a step S5, the monitoring device 12 executes a check as to whether the second semiconductor switch 5 is to be switched to the conducting state. The monitoring device 12 executes the check according to step S5 with reference to the value of a control signal C2, by means of which the second semiconductor switch 5 is controlled by the control device 3. The corresponding value is fed to the monitoring device 12, for example by the control device 3, in the form of the corresponding information C2'.

If the second semiconductor switch 5 is to be switched to the conducting state, in a step S6, the monitoring device 12 executes a check as to whether the difference U1' lies within a predefined second voltage range. The second voltage range comprises voltages which encompass a second voltage value Ub. The second voltage value Ub is given by:

$$Ub=R3*Ud/(R2+R3)$$

If the difference U1' lies within the second voltage range, in a step S7, the monitoring device 12 sets the signal M1 to the value M1=0 which, in practice, signifies "semiconductor switch 5 properly conducting". If the difference U1' lies outside the second voltage range, in a step S8, the monitoring device 12 sets the signal M1 to the value M1=1 which, in practice, signifies "semiconductor switch 5 not properly conducting".

If the second semiconductor switch 5 is also not to be set to the conducting state, in a step S9, the monitoring device 12 executes a check as to whether the difference U1' lies within a predefined third voltage range. The third voltage range comprises voltages which encompass a third voltage value Uc. The third voltage value is given by:

$$Uc=R3*U0/(R1+R2+R3)$$

If the difference U1' lies within the third voltage range, in a step S10, the monitoring device 12 sets the signal M1 to the value M1=0 which, in practice, signifies "actual voltage U correct". If the difference U1' lies outside the third voltage range, in a step S11, the monitoring device 12 sets the signal M1 to the value M1=1 which, in practice, signifies "actual voltage U not correct". Optionally, step S11 can additionally comprise a check as to whether the actual voltage U lies above or below the rated voltage U0. In this case, optionally, the signal M1 can correspondingly assume different values, for example in one case M1=+1, and in another case M1=−1.

From the preceding explanations, it evidently proceeds from the signal M1 whether, in an operating state in which one of the two semiconductor switches 4, 5 of the load bridge 2 is actuated, the difference U1' lies outside a voltage range which is dictated by the actuation state C1, C2 of the two semiconductor switches 4, 5 of the load bridge 2. Depending upon the specific configuration, the symbol and/or the magnitude by which the respective difference U1' deviates from the respective predefined voltage range can also be inferred from the signal M1. It moreover proceeds from the signal M1 whether, in an operating state in which neither of the two semiconductor switches 4, 5 of the load bridge 2 is actuated, the difference U1' lies outside a voltage range which is dictated by the actuation state C1, C2 of the two semiconductor switches 4, 5 of the load bridge 2. Here again, the symbol and/or the magnitude by which the respective difference U1' deviates from the respective predefined voltage range can also be inferred from the signal M1.

The signal M1 thus determined, in a step S12, is transmitted by the monitoring device 12 to the control device 3. In this regard, in the interests of proper order, it should further be observed that the monitoring device 12 can be a component of the control device 3. In this case, naturally, no dedicated transmission is required. On the grounds of the availability of the signal M1 to the control device 3 (and the circumstance whereby the control device 3, as required, can also archive the signal M1 or execute the logging thereof in an operating history, and can also execute the classification of a specific actuation state of a specific semiconductor switch 4, 5), the control device 3 is thus in a position to consider the signal M1 in the actuation of the load bridges 2.

The load bridges 2, as mentioned above, are customarily of an identical design. Accordingly, the specific design, the specific actuation and the specific method of operation of the further load bridges 2 are not described in any further detail. The corresponding control signals for the further load bridges are identified in FIG. 1 as C3 and C4 or C5 and C6 respectively, the associated information as C3' to C6', and the corresponding tapped-off potentials as U2 and U3. Evaluation of the further tapped-off potentials U2, U3 is executed in an analogous manner to the evaluation of the tapped-off potential U1. The associated signals, which are determined by the monitoring device 12, are identified in FIG. 1 as M2 and M3. The signals M2, M3 are also transmitted by the monitoring device 12 to the control device 3.

Employment of the signals M1 to M3 by the control device 3 can be executed in various ways. For example, the control device 3, in the event of the occurrence of deviations in the difference U1' which exceed the respectively anticipated value and/or, more frequently, deviations in the difference U1' from the respectively anticipated value, can execute the switch-off of the load bridges 2 and/or the isolation thereof from the potentials P1, P2. Hereinafter, in conjunction with FIG. 4, a further potential form of employment of the signals M1 to M3 by the control device 3 is described.

Figure 4:
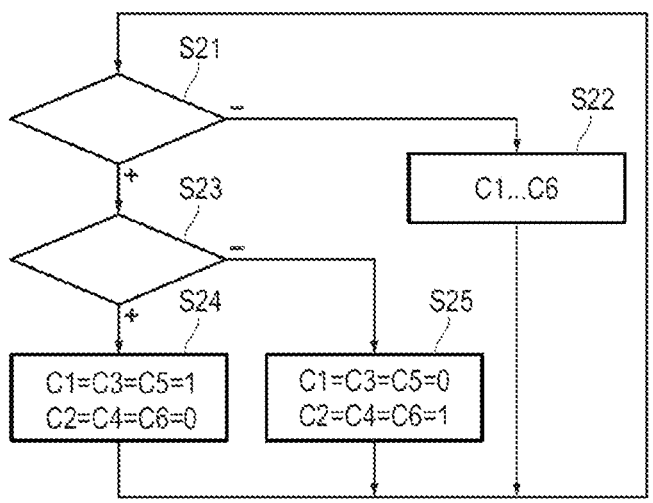
FIG. 4 shows a further flow diagram.

According to FIG. 4, the control device 3, in a step S21, executes a check as to whether the load 7 is to be transferred to an active short-circuit. The check according to step S21 is executed, in a manner which is known per se, by reference to a state of the load 7 and/or of the load bridges 2. If the load 7 is not to be transferred to an active short-circuit, the control device 3, in a step S22, executes an actuation of the load branches of the load bridges 2. This actuation is not the subject matter of the present invention per se. Conversely, if the load 7 is to be transferred to an active short-circuit, the control device 3, in a step S23, executes a check as to whether, for the establishment of the active short-circuit, the first or the second load branches of the load bridges 2 are to be switched to the conducting state. The determination according to step S23 is executed by the control device 3 by the employment of the signals M1, M2, M3. Depending upon the outcome of the check according to step S23, the control device 3 either, in a step S24, switches the first load branches or, in a step S25, switches the second load branches of the load bridges 2 to the conducting state.

According to the prior art, the control device 3, according to the representation in FIG. 2, customarily comprises a respective driver circuit 13 for each semiconductor switch 4, 5. The respective driver circuit 13 endeavours to drive a (small) current I1 or I2 via the semiconductor switches 4, 5, which current I1 or I2 is then fed back to the control device 3. The currents I1 or I2—evidently—are not the load currents (with no reference symbols) which are fed to the load 7.

The driving of such a current I1 or I2 will only be possible if the respective semiconductor switch 4, 5 is switched to the conducting state. For isolation from the potentials P1, P2, moreover, a diode 14 is arranged at an appropriate location in the current circuits which carry the currents I1 or I2.

In the context of the present invention, the driver circuits 13 (and also the diodes 14 associated therewith) can be omitted. For this reason, in FIG. 2, the driver circuits 13 and the diodes 14 are represented by broken lines only.

As described above, the load branches of the load bridges 2 respectively comprise only a single semiconductor switch 4, 5. However, it is also possible for the load branches to respectively comprise a plurality of series-connected semiconductor switches 4, 5, 15, 16 and, according to the representation in FIG. 5, two such semiconductor switches 4, 5, 15, 16. Here again, a freewheeling diode 4', 5', 15', 16' is respectively connected in parallel with the semiconductor switches 4, 5, 15, 16 (either intrinsically or as a standalone component). Moreover, the two semiconductor switches 15, 16, which are directly connected to the node point 6, are connected via diodes 17 to a further potential P3. The third potential P3 customarily exhibits a value between the first and the second potentials P1, P2. In particular, it can lie—either exactly or approximately—midway between the first and the second potentials P1, P2.

Figure 5:
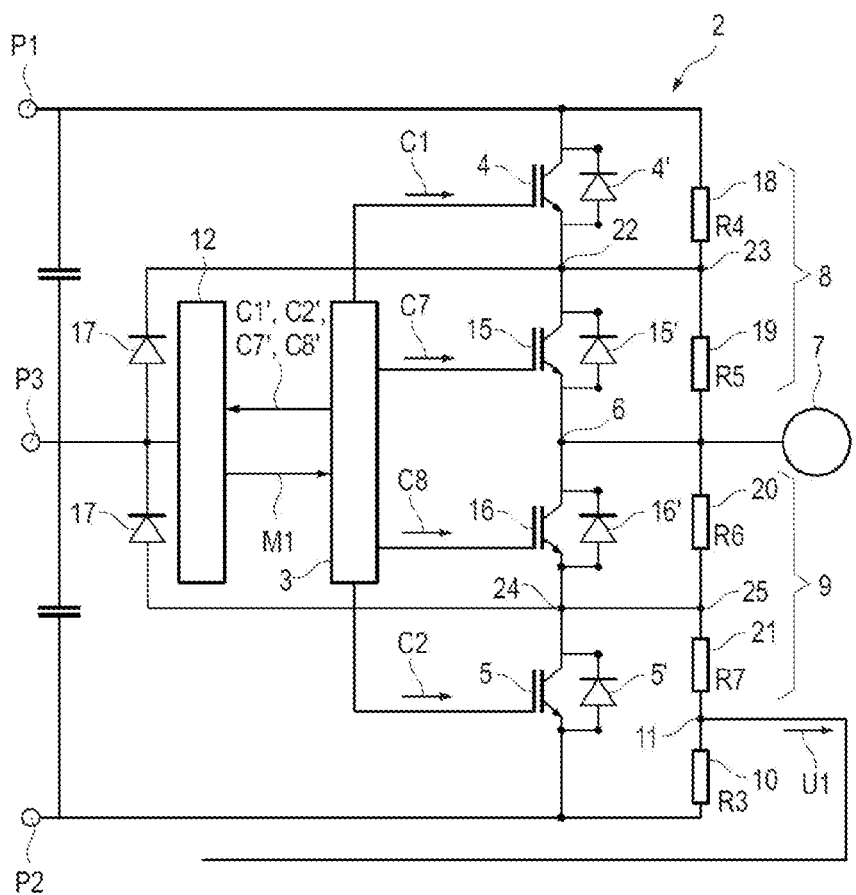
FIG. 5 shows a further load bridge and the associated part of a control circuit.

As will be known to persons skilled in the art, in a load bridge 2 as represented in FIG. 5, a plurality of circuit states are possible:

Firstly (naturally), all the semiconductor switches 4, 5, 15, 16 can assume the non-conducting state.

Moreover—analogously to the configuration according to FIG. 2—the first potential P1 can be connected to the node point 6. To this end, the semiconductor switches 4, 15 are switched to the conducting state, whereas the semiconductor switches 5, 16 remain non-conducting.

Likewise—again analogously to the configuration according to FIG. 2
the second potential P2 can be connected to the node point 6. To this end, the semiconductor switches 5, 16 are switched to the conducting state, whereas the semiconductor switches 4, 15 remain non-conducting.

Finally, however,
and this represents an additional form of operation vis-à-vis the configuration according to FIG. 2—the further potential P3 can be connected to the node point 6. To this end, the semiconductor switches 15 and/or 16 are switched to the conducting state, whereas the semiconductor switches 4, 5 remain non-conducting.

In the case of the configuration according to FIG. 5, it is also possible that each of the resistance circuits 8, 9 forms only one bridge from the respective potential P1, P2 to the node point 6. In this case, only one evaluation of the tapped-off potential U1 is possible by the method according to FIG. 3. Preferably, however, in the case of the configuration of the load branches according to FIG. 5, the first resistance circuit 8 comprises a plurality of series-connected resistance subcircuits 18, 19. Preferably, the second resistance circuit 9 likewise comprises a plurality of series-connected resistance subcircuits 20, 21. Each of the resistance subcircuits 18, 19, 20, 21 can be comprised of a plurality of resistances. It is sufficient, however, if they are respectively comprised of a single resistance, which is identical to the respective resistance subcircuit 18, 19, 20, 21. Independently of the actual configuration, however, the resistance subcircuits 18, 19, 20, 21 exhibit a respective resistance value R4, R5, R6, R7. Connection points 22 between the semiconductor switches 4, 15 of the first load branch, in this case, are connected to connection points 23 between the resistance subcircuits 18, 19 of the first resistance circuit 8. In an analogous manner, connection points 24 between the semiconductor switches 5, 16 of the second load branch, in this case, are connected to connection points 25 between the resistance subcircuits 20, 21 of the second resistance circuit 9.

In this configuration, each semiconductor switch 4, 5, 15, 16 can be checked separately, particularly including the state in which the semiconductor switches 15 and/or 16, or only one of the semiconductor switches 15 and/or 16, is actuated by means of a corresponding control signal C7, C8. Here again, corresponding information C7', C8' is preferably transmitted by the control device 3 to the monitoring device 12. The corresponding adjustment and extension of the flow diagram according to FIG. 3 is possible with no further action, and lies within the scope of a person skilled in the art. Accordingly, no detailed description thereof is required.

It is possible that the resistance values R4, R5, R6, R7 are mutually identical. Preferably, however, they are mutually differing. This improves options for fault evaluation. In particular, in the event that only one of the two semiconductor switches 15 and/or 16 is actuated by means of a corresponding control signal C7 or C8 and—by way of a malfunction—in practice, one of the two adjoining semiconductor switches 4 or 16, or 15 or 5, additionally responds, it can be detected whether and which of the semiconductor switches 4 or 16, or 15 or 5, has also responded.

The present invention provides numerous advantages. In particular, it is possible, in a simple manner—in practice, using only one tap-off point 11 per load bridge 2—and at any time (including during switching operations) to detect the voltage drop across a respectively switched semiconductor switch 4, 5, 15, 16 of the respective load bridge 2. Moreover, the actual voltage U can be determined. Any dedicated detection is no longer required, or can be supported in a redundant manner.

The preceding description is intended exclusively for the illustration of the present invention. Conversely, the scope of protection of the present invention is dictated exclusively by the attached claims.

LIST OF REFERENCE SYMBOLS

1 Inverter unit
2 Load bridges
3 Control device
4, 5, 15, 16 Semiconductor switch
4', 5', 15', 16' Freewheeling diodes
6 Node point
7 Load
8, 9, 10 Resistance circuits
11 Tap-off point
12 Monitoring device
13 Driver circuits
14, 17 Diodes
18, 19, 20, 21 Resistance subcircuits
22, 23, 24, 25 Connection points
C1 to C8 Control signals
C1' to C8' Information
I1, I2 Currents
M1, M2, M3 Signals
P1, P2, P3 Potentials
R1 to R7 Resistance values
S1 to S25 Steps
U Actual voltage
U0 Rated voltage
U1, U2, U3 Tapped-off potentials
U1' Difference
Ua, Ub, Uc Voltage values Also, the inventors intend that only those claims which use the specific and exact phrase "means for" are intended to be interpreted under 35 USC 112. The structure herein is noted and well supported in the entire disclosure. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. An inverter unit, comprising:
a plurality of load bridges;
each of the load bridges has a first and a second load branch, via which a node point of the respective load bridge which is connected to a load is connectable to a first and a second potential;
each of the load branches has at least one semiconductor switch;
wherein each respective node point is connected to said first potential (P1) via a respective first resistance circuit of a resistance series circuit;
a respective tap-off point of the resistance series circuit is connected via a respective second resistance circuit of the resistance series circuit to the respective node point, and via a respective third resistance circuit of the resistance series circuit to the second potential;
the respective tap-off point is further connected to a monitoring device which determines a difference between a potential which is tapped-off at the tap-off point and the second potential;
the monitoring device is connected to a control device for the load bridges and, in at least one operating state, wherein one of the two load branches of a respective load bridge is actuated, transmits a signal to the control device, from which it is determined whether the difference between the potential which is tapped-off at a respective tap-off point and the second potential lies outside a voltage range which is predefined by an actuation state of the two load branches of the respective load bridge; and
wherein the control device, upon actuation of the load bridges, considers the signals which are transmitted thereto by the monitoring device.

2. The inverter unit, according to claim 1, wherein:
from the signal, it can also be determined whether the difference between the potential which is tapped-off on the respective tap-off point and second potential lies outside a voltage range which is dictated by a rated voltage, and in that the monitoring device transmits the signal to the control device, even in an event that neither of the two load branches of a respective load bridge is actuated.

3. The inverter unit according to claim 2, wherein:
the first and the second load branch respectively further have a plurality of series-connected semiconductor switches;
the first and the second resistance circuit respectively have a plurality of series-connected resistance subcircuits; and
respective connection points between the semiconductor switches of the first and the second load branch are connected to connection points between the resistance subcircuits of the first and the second resistance circuit.

4. The inverter unit, according to claim 3, wherein:
the resistance subcircuits exhibit mutually differing resistance values.

5. The inverter unit, according to claim 4, wherein:
the control device does not include any driver circuits by means of which, in a respectively conducting semiconductor switch, a current can be driven via the respectively conducting semiconductor switch and fed back to the control device.

6. The inverter unit according to claim 4, wherein:
a number of load bridges is greater than one;
the control device, by reference to a state of the load and/or the load bridges, executes a decision as to whether the load is to be transferred to an active short-circuit, in that the control device, for an establishment of an active short-circuit, switches either the first or the second load branches of the load bridges to a conducting state, and in that the control device, by an employment of the signals transmitted by the monitoring device, executes a decision as to whether the first or the second load branches of the load bridges are to be switched to a conducting state.

7. An operating method for an inverter unit, comprising the steps of:
providing an inverter unit, further comprising;
a plurality of load bridges;
each of the load bridges has a first and a second load branch, via which a node point of the respective load bridge which is connected to a load is connectable to a first and a second potential:
each of the load branches has at least one semiconductor switch;
wherein each respective node point is connected to said first potential via a respective first resistance circuit of a resistance series circuit;
a respective tap-off point of the resistance series circuit is connected via a respective second resistance circuit of the resistance series circuit to the respective node point, and via a respective third resistance circuit of the resistance series circuit to the second potential:
the respective tap-off point is further connected to a monitoring device which determines a difference between a potential which is tapped-off at the tap-off point and the second potential:
the monitoring device is connected to a control device for the load bridges and, in at least one operating state, wherein one of the two load branches of a respective load bridge is actuated, transmits a signal to the control device, from which it is determined whether the difference between the potential which is tapped-off at a respective tap-off point and the second potential lies outside a voltage range which is predefined by an actuation state of the two load branches of the respective load bridge; and
wherein the control device, upon actuation of the load bridges, considers the signals which are transmitted thereto by the monitoring device;
wherein a control device of the inverter unit actuates semiconductor switches of respective said first load branch and said respective second load branch of load bridges, such that said load and said connected node point between the two load branches of the respective load bridge is temporarily connected via the first load branch of the respective load bridge to said first potential, and via the second load branch of the respective load bridge to said second potential,
wherein said potential which is applied to a respective tap-off point of said resistance series circuit, which is connected via said respective second resistance circuit of the resistance series circuit to the respective node point and via said respective third resistance circuit of the resistance series circuit to the second potential, wherein the respective node point is further connected via said respective first resistance circuit of the resistance series circuit to the first potential, is tapped-off and is fed to said monitoring device of the inverter unit;

the monitoring device determines the difference between the potential which is tapped-off at the respective tap-off point and the second potential and, in at least one operating state, in which one of the two load branches of said respective load bridge is actuated, transmits said signal to the control device, from which it is determined whether the difference between the potential which is present on the respective tap-off point and the second potential lies outside said voltage range which is dictated by the actuation state of the two load branches of the respective load bridge, and the control device, for the actuation of load bridges, considers the signals which are transmitted thereto by the monitoring device.

8. The operating method, according to claim 7, wherein:

from the signal it is also determined whether the difference between the potential which is tapped-off at the respective tap-off point and the second potential lies outside a voltage range which is dictated by a rated voltage, and in that the monitoring device transmits the signal to the control device, even in the event that neither of the two load branches of a respective load bridge is actuated.

9. The operating method, according to claim 8, wherein:

the number of load bridges is greater than one; and the control device, by reference to a state of the load and/or the load bridges, executes a decision as to whether the load is to be transferred to an active short-circuit, in that the control device, for the establishment of an active short-circuit, switches either the first or the second load branches of the load bridges to a conducting state, and in that the control device, by the employment of the signals transmitted by the monitoring device, executes a decision as to whether the first or the second load branches of the load bridges are to be switched to a conducting state.

* * * * *